United States Patent [19]

Wojcikowski

[11] 3,991,789

[45] Nov. 16, 1976

[54] INFINITELY ADJUSTABLE CYCLIC TIMING DEVICE

[75] Inventor: Richard J. Wojcikowski, Toledo, Ohio

[73] Assignee: Dana Corporation, Toledo, Ohio

[22] Filed: Mar. 31, 1975

[21] Appl. No.: 563,324

[52] U.S. Cl. .............................. 137/624.2; 250/233; 250/234

[51] Int. Cl.[2] ........................ G01D 5/44; G01D 5/36

[58] Field of Search ......... 91/3; 137/82, 83, 624.15, 137/624.17, 624.2; 250/233, 234

[56] References Cited

UNITED STATES PATENTS

| | | | |
|---|---|---|---|
| 1,820,252 | 8/1931 | Shippy | 137/624.2 |
| 2,227,037 | 12/1940 | Schlesinger | 250/233 |
| 2,228,700 | 1/1941 | Hamner et al. | 137/624.17 X |
| 2,286,170 | 6/1942 | Heiland | 250/233 X |
| 2,521,946 | 9/1950 | Rathje | 250/233 UX |
| 2,780,242 | 2/1957 | Dyson | 137/82 X |
| 2,884,940 | 5/1959 | Gorrie | 137/82 X |
| 3,307,041 | 2/1967 | Kling | 250/233 X |
| 3,347,252 | 10/1967 | Hanson | 137/624.15 X |
| 3,596,671 | 8/1971 | Scharfenberger | 137/83 X |
| 3,886,354 | 5/1975 | Swiden et al. | 250/234 X |

FOREIGN PATENTS OR APPLICATIONS

| | | | |
|---|---|---|---|
| 682,582 | 10/1939 | Germany | 250/233 |
| 103,653 | 1/1963 | Netherlands | 250/233 |

OTHER PUBLICATIONS

Application Bulletin of Askania Regulator Co., 3.5 UOC 11-56.

*Primary Examiner*—Alan Cohan
*Assistant Examiner*—Gerald A. Michalsky
*Attorney, Agent, or Firm*—Oliver E. Todd, Jr.; Robert E. Pollock

[57] ABSTRACT

An adjustable dwell cyclic timing device. An element having a timing surface with a radius or other measurement varying from a minimum value to a maximum value and back to a minimum value, and preferably having generally a heart shape when the element is in the form of a disc, is rotated in synchronism with a timing cycle. A sensor is positioned to sense the presence and absence of the timing surface in a region between the minimum and maximum radii or other measurements only when the element is rotated through a predetermined angular segment for generating a cyclic timing signal during a preselected time segment in each cycle. The sensor position is adjustable for changing the preselected segment of the timing signal in each cycle to provide a desired starting point and dwell for the generated timing signal. A plurality of sensors may be positioned adjacent the path of the rotating timing element for generating a plurality of different cyclic timing signals during different preselected time segments in each cycle.

8 Claims, 12 Drawing Figures

INFINITELY ADJUSTABLE CYCLIC TIMING DEVICE

BACKGROUND OF THE INVENTION

This invention relates to timing devices and more particularly to a device for providing an adjustable dwell cyclic timing signal at a predetermined point in a cycle.

Many devices which are cyclic in nature require means for generating a cyclic control signal at a predetermined time in an operating cycle and having a predetermined dwell or duration. A common method for timing the operating cycle of machines, such as lathes, presses, etc., is through the use of cam actuated switches. A cam, which is rotated in synchronism with an operating cycle, opens and closes a switch at predetermined points in the cycle for generating timing signals. However, such an arrangement provides a very limited degree of flexibility. If the machine is to be modified for use in a different production sequence, the cam typically must be replaced to change the timing and dwell of the control signal. Flexibility is also limited by the fact that a separate cam and switch assembly is generally required for each different timing signal required in an operating cycle. Many processes may require perhaps one hundred or more separate control signals at different points in a cycle, with the signals having different durations. Considerable time and expense is required to replace or modify the cams when such processes are changed.

SUMMARY OF THE INVENTION

According to the present invention, an improved timing device is adapted to provide one or more cyclic control signals, each at different times in an operating cycle and of different durations or dwell angles. The device is adjustable to permit changing the angular position and the duration or dwell angle of each cyclic control signal. The device generally comprises a timing element which is rotated in synchronism with a timing cycle. The timing element includes a timing surface having a non-uniform measurement which varies from a minimum value to a maximum value and back to the minimum value. The element may take the form of a disc and the timing surface may be in the shape of an eccentrically mounted circle or, preferably, of generally a heart shape. In this form, the non-uniform measurement is the radius which varies about the center of rotation. A sensor is mounted to detect the presence or absence of the rotating timing surface in a region between the minimum and maximum radii. The sensor is of a conventional type such as a fluidic sensor, an optic sensor, a magnetic sensor, a mechanical switch or an electronic proximity detector. The angular position or point of occurrence of the timing signal in each cycle may be changed by modifying the angular position of the sensor about the axis of rotation of the timing disc while the duration or dwell of the timing signal may be changed by radially changing the position of the sensor with respect to the center of rotation of the timing disc. In a second embodiment, the element is generally cylindraceous and may take the form of an obliquely truncated right cylinder. As the element is rotated about its axis, the truncated portion defines the timing surface which is sensed by a pneumatic sensor, for example. The point of occurrence of the generated timing signal is determined by the angular position of the sensor about the axis of rotation of the element while the duration or dwell is determined by the location of the sensor in the axial direction of the element. For generating a plurality of timing signals having different angular positions and different durations, a plurality of sensors are positioned for sensing the timing surface at different points in the path of rotation between the minimum and maximum measurements.

Accordingly, it is an object of the invention to provide an improved device for generating one or more cyclic timing signals, each having a predetermined point of occurrence and duration in a cycle.

Another object of the invention is to provide an improved device for generating cyclic timing signals in which both the point of occurrence in each cycle and the dwell or duration of the signal are adjustable.

Other objects and advantages of the invention will become apparent from the following detailed description, with reference being made to the accompanying drawings.

DESCRIPTION OF THE PREFERRED EMBODIMENTS

Figure 1:
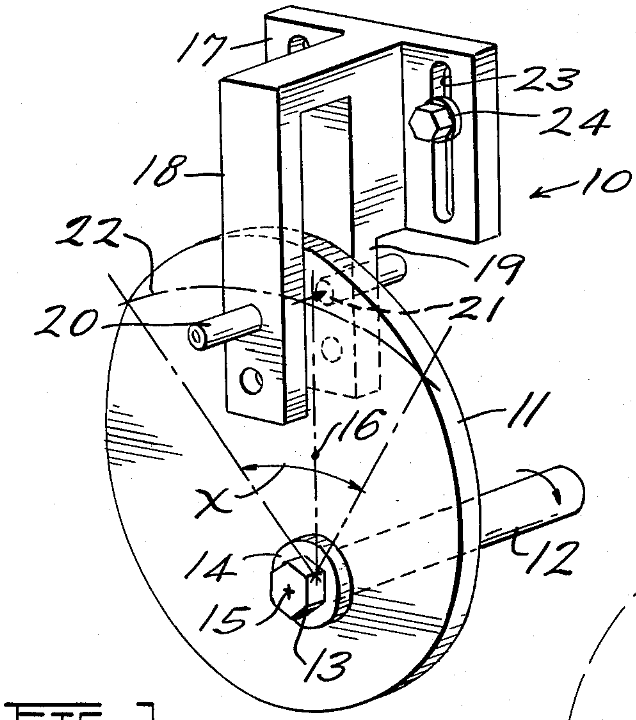
FIG. 1 is a fragmentary perspective view showing a first embodiment of an adjustable dwell cyclic timing device incorporating the present invention.

Turning now to FIG. 1, a device 10 is shown for generating a cyclic timing or control signal which is adjustable both in dwell or duration and in the point of occurrence in each cycle. The device 10 includes a timing element taking the form of a timing disc 11 which is mounted on a shaft 12 which is rotated in synchronism with an operating cycle. For example, if the device 10 is used for generating a control signal during a predetermined interval in the operating cycle of a punch press, the shaft 12 may be geared to the punch press to be driven one revolution for each cycle of the press. The disc 11 is attached to the shaft 12 by any convenient means. For example, the disc 11 is shown attached to an end of the shaft 12 by means of a bolt 13 which is threaded into the shaft 12 and a hub 14. The timing disc 11 is of a circular configuration and is eccentrically mounted on the shaft 12 to rotate about a center of rotation 15 which is spaced from the true center 16 of the circular disc 11.

A generally U-shaped bracket 17 is mounted adjacent the timing disc 11 such that a pair of spaced legs 18 and 19 on the bracket 17 straddle the path of the rotating timing disc 11. The legs 18 and 19 support optical sensor elements comprising a light source 20 and a photocell 21, respectively, for sensing the presence or absence of the timing disc 11. The photocell 21 has a first electrical state when the path between the light source 20 and the photocell 21 is unobstructed and a second electrical state when the path is obstructed by the timing disc 11 which has an opaque timing surface. It will be noted that as the shaft 12 is rotated in the direction shown by the arrow, the timing disc 11 will obstruct the light path between the optical sensor elements 20 and 21 through a predetermined angle of X° since the portion of the disc 11 described along the line 22 blocks the light path between the optical sensor elements 20 and 21. The bracket 17 which mounts the optical sensor elements 20 and 21 is mounted for radial adjustment toward and away from the center of rotation 15 by means of an elongated slot 23 and a bolt 24. As the optical sensor elements 20 and 21 are moved towards the center of rotation 15, the path 22 increases in length and the angle X° increases. Thus, the dwell of the control signal generated by the sensor elements 20 and 21 increases. Similarly, there is a decrease in the dwell or duration of the control signal as the bracket 17 is moved to move the optical sensor elements 20 and 21 away from the center of rotation 15. The limiting sensor positions are the minimum radius $R_{min}$ and the maximum radius $R_{max}$ of the timing disc 11, as measured from the center of rotation 15. By moving the optical sensor elements 20 and 21 an appropriate distance towards or away from the center of rotation 15, the dwell of the control signal generated by the sensor elements 20 and 21 may be varied infinitely between a signal which is off all of the time when the sensor elements 20 and 21 are closer than $R_{min}$ to the center of rotation 15 to a signal which is on all of the time when the sensor elements 20 and 21 are further than $R_{max}$ from the center of rotation 15.

In addition to providing infinite adjustability of the dwell of the control signal generated by the sensor elements 20 and 21, the timing or point of occurrence of the control signal in each cycle is infinitely adjustable either by rotating the location of the optical sensor elements 20 and 21 about the center of rotation 15 or by rotating the timing disc 11 with respect to the shaft 12. It should also be noted that although a single bracket 17 is shown in FIG. 1 for mounting a single pair of optical sensor elements 20 and 21, a plurality of similar brackets 17 may be located for mounting similar sensor elements for sensing the timing disc 11 at predetermined positions in the path defined by the minimum and maximum radii of the rotating timing disc 11. Each sensor element will then generate a separate control signal which may or may not be overlapping with the control signal generated by the other sensor elements, depending upon the positions at which the elements are mounted.

Figure 2:
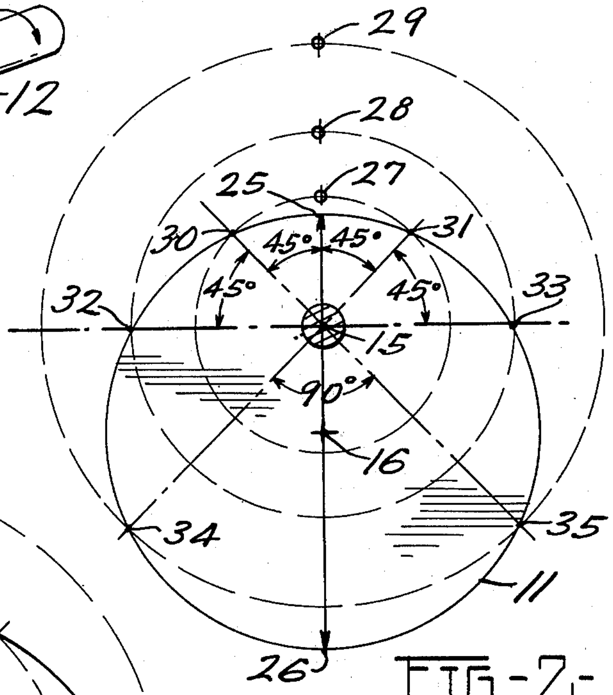
FIG. 2 is a plan view of the disc-shaped circular timing element of FIG. 1, showing the effect of different sensor locations on the dwell or duration of the timing signal.

Turning to FIG. 2, a plan view of the timing disc 11 is shown to demonstrate the manner in which positioning the sensor elements 20 and 21 changes the duration or dwell of the timing signal. The minimum radius of the timing disc 11 extends from the center of rotation 15 to a point 25 while the maximum radius extends from the center of rotation 15 to a point 26. It will be seen from FIG. 2 that the radius of the disc 11 progressively increases from the point 25 to the point 26 for an increasing angle about the center of rotation 15 and then decreases from the point 26 back to the point 25. Three sensors 27–29 are shown positioned for generating control signals of different dwell angles or duration. The sensor 27 is spaced from the center of rotation 15 a distance slightly greater than the minimum radius or distance to the point 25. The timing disc 11 is shown in a position where it is clear of the sensor 27. As the disc 11 is rotated in a clockwise direction, for example, the sensor 27 senses the disc 11 when rotated 45° and a point 30 passes the sensor 27. The sensor 27 then continues to sense the timing disc 11 until a point 31 passes the sensor 27. For the radial position of the sensor 27 shown in FIG. 2, the timing disc 11 will be sensed by the sensor 27 for a rotation of 270° and will not be sensed for 90° of rotation. By moving the sensor radially outward from the position of the sensor 27 to the position of the sensor 28, the timing disc 11 will not reach the sensor 28 until rotated 90° and a point 32 on the timing disc 11 passes the sensor 28. The timing disc 11 will then remain adjacent the sensor 28 until rotated 180° and a point 33 is reached. At this sensor position, the sensor 28 will detect the presence of the timing disc 11 for 180° of rotation and will detect the absence of the disc 11 for the other 180° of rotation. By moving the sensor radially still further out to the position of the sensor 29, the path of the timing disc 11 is intersected by the sensor 29 between the points 34 and 35 to sense the presence of the timing disc 11 for only 90° of rotation while sensing the absence of the disc 11 for the remaining 270° of rotation. As the sensors are moved further out from the position of the sensor 29 to a distance equal to the maximum radius of the disc 11, the duration or number of degrees of rotation of the disc 11 during which the sensor detects the timing disc 11 decreases to 0°. Or, as the sensor is moved towards the center of rotation 15 from the position of the sensor 27 to a point spaced from the center of rotation 15 equal to the minimum radius of the disc 11, the duration or number of degrees of rotation of the disc 11 during which the sensor detects the disc 11 increases to 360°.

There is difficulty in obtaining accurate adjustments of the duration or dwell when the sensor is positioned much closer to the center of rotation 15 than the sensor 27 or much further from the center of rotation than the position of the sensor 29 since the path of the timing disc 11 passing adjacent the sensor approaches a circle tangential to the disc 11 at the points 25 or 26, respectively. The problem is accentuated by the fact that the sensors will sense an area having a relatively large width rather than the theoretically ideal point. For example, an optical sensor may sense a light beam having a diameter on the order of perhaps 1/16 to ⅛ of an inch.

Figure 3:
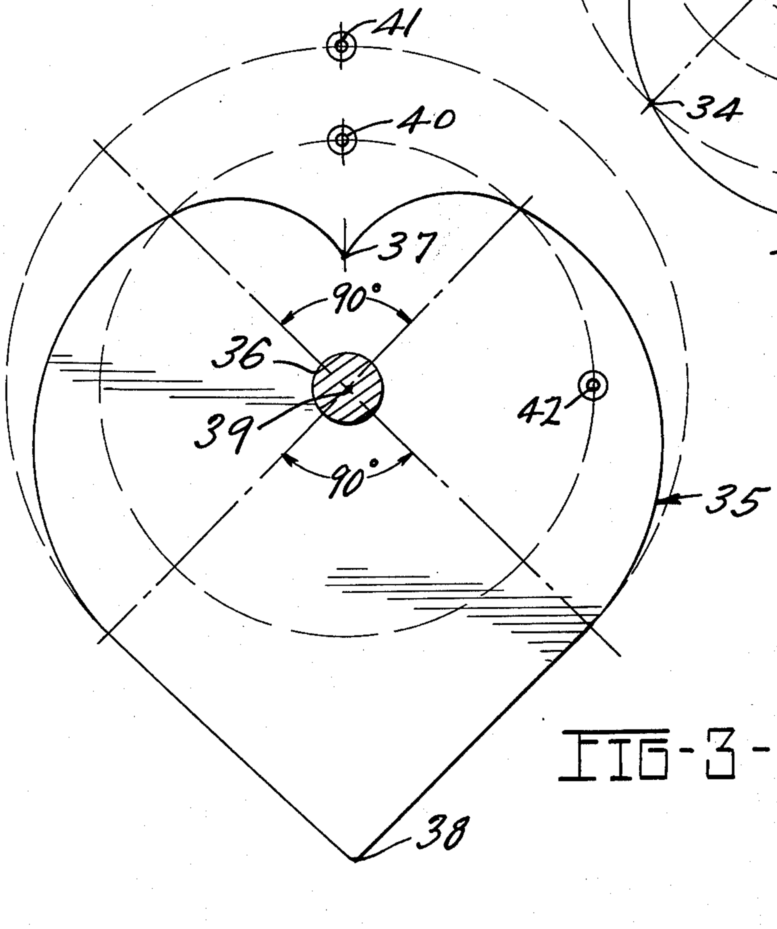
FIG. 3 is a plan view of a generally heart-shaped timing element.

The problem for accurately establishing small and large dwells is eliminated by using a generally heart-shaped timing disc. Turning to FIG. 3, a timing element in the form of a heart-shaped timing disc 35 is shown in plan. The heart shape of the disc may be a specific geometric figure such as a cardioid or it may be generated from a part of a geometric figure such as involutes and spirals. However, it should be appreciated that the disc 35 need not fall into the precise mathematical definition of any specific geometric shape. The disc 35 is attached to a driven shaft 36 for rotation in synchronism with an operating cycle of a machine for which timing signals are generated. The heart-shaped disc 35 has a point of minimum radius 37 and a point of maximum radius 38 from a center of rotation 39. As with the circular disc 11 in FIGS. 1 and 2, it will be seen that the radius of the disc 35 progressively increases from the point of minimum radius 37 to the point of maximum radius 38 and returns back to the point of minimum radius 37 when moving angularly about the center of rotation 39. However, the heart-shaped disc 35 has an appreciably greater rate of change in the radius near the points of minimum radius 37 and maximum radius 38 than does an eccentrically mounted circular timing disc as shown in FIGS. 1 and 2. This permits a significantly greater sensitivity or preciseness of control over the dwell angle as the sensor position approaches a spacing from the center of rotation 39 equal to either the minimum radius or the maximum radius of the disc 35.

Figure 4:
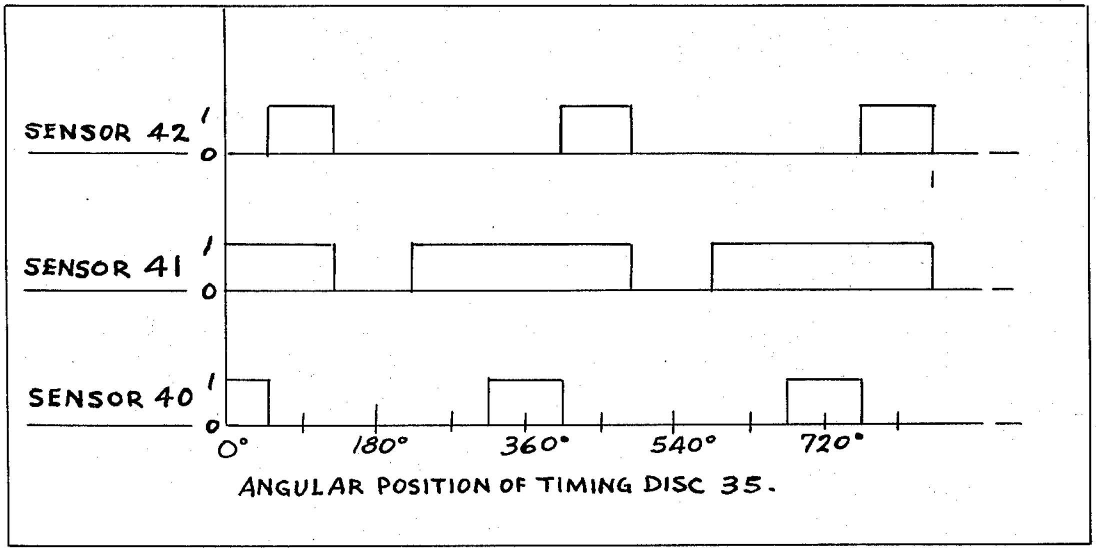
FIG. 4 is a graph showing timing signals generated by the three sensors in FIG. 3.

FIG. 3 shows three sensors positioned adjacent the timing disc 35 for generating three separate timing signals, and the three generated signals are shown in FIG. 4. A sensor 40 is positioned at a distance from the center of rotation 39 for generating a signal having a first state during 90° of rotation of the disc 35 and having a second state during the remaining 270° of rotation. A sensor 41 is spaced radially outward from the sensor 40 for generating a signal having the first state for 270° instead of 90° and the second state for 90° instead of 270°. The centers of the signals generated by the sensors 40 and 41 coincide in time in each cycle, as is shown in FIG. 4. A sensor 42 is positioned the same distance from the center of rotation 39 as the sensor 40, only displaced 90° clockwise about the center of rotation 39. Thus, if the timing disc 35 is rotated in a clockwise direction from the position shown in FIG. 3, after the disc 35 rotates 45°, the signal from the sensor 40 will change from a first state to a second state and, simultaneously, the signal from sensor 42 will change from the second state to the first state. The phase or point of occurrence of the signals generated by the two sensors 40 and 42 are displaced 90° in each cycle, just as the sensors 40 and 42 are displaced about the center of rotation 39 by 90°. Of course, additional sensors may be located around the center of rotation 39 at points located between the minimum and maximum radii of the disc 35 for generating other timing signals having preselected dwells and points of occurrence.

Figure 5:
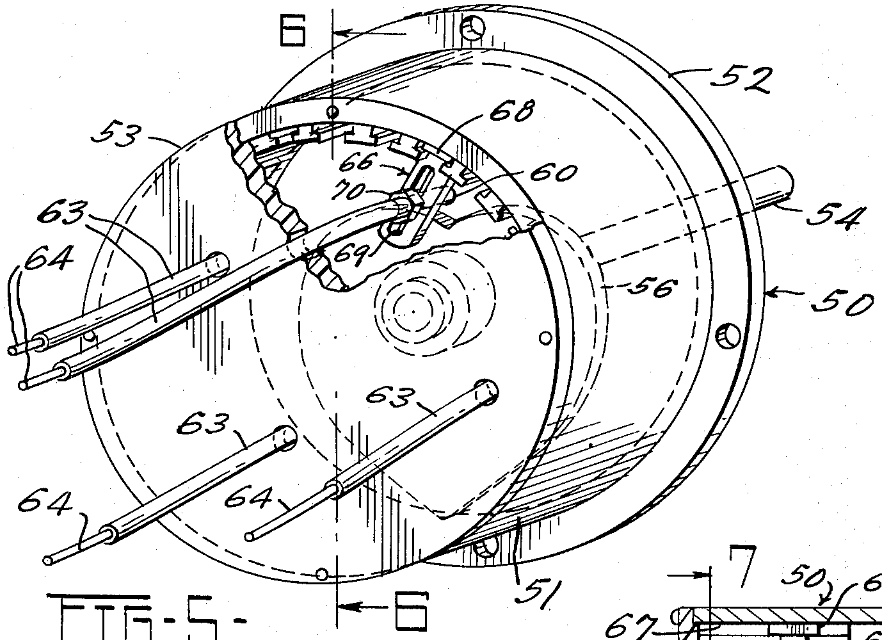
FIG. 5 is a partially broken away perspective view of a modified embodiment of the invention.
Figure 6:
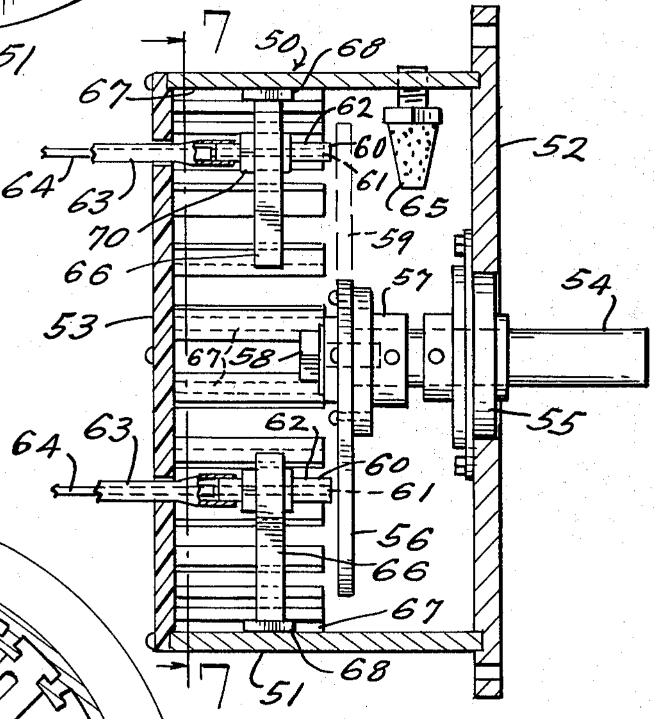
FIG. 6 is a cross-sectional view taken along the line 6—6 of FIG. 5.
Figure 7:
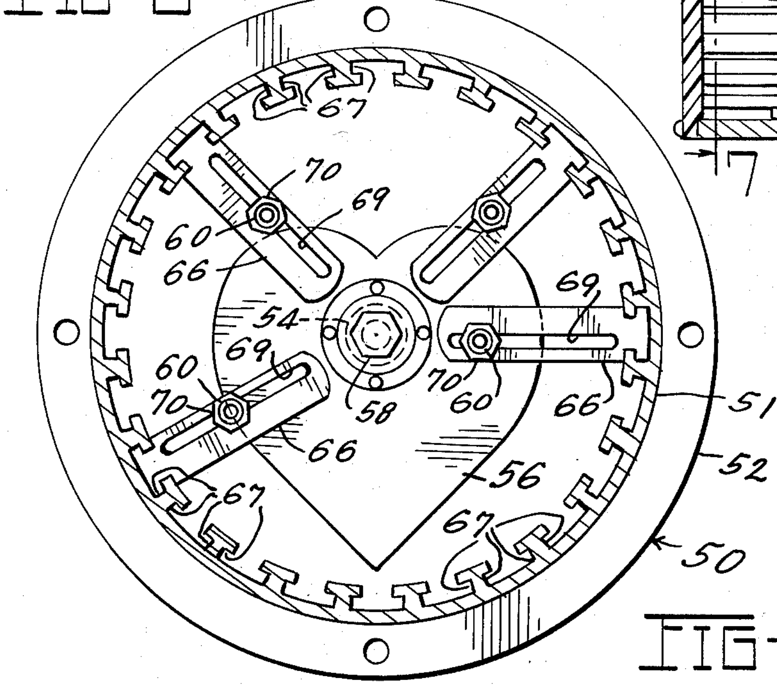
FIG. 7 is a cross-sectional front view taken along the line 7—7 of FIG. 6.

FIGS. 5–7 show a modified embodiment of a device 50 for generating a plurality of cyclic timing signals, each having an adjustable dwell and point of occurrence. The device 50 includes a cylindrical housing 51 which is enclosed by a base plate 52 and a cover plate 53. A shaft 54 is mounted to rotate in a bearing 55 which is attached to the base plate 52. The shaft 54 is rotated by conventional means (not shown) in synchronism with a cycle for which the cyclic timing signals are generated. For example, the shaft 54 may be geared to be driven with a machine tool such that the shaft 54 is rotated one revolution for each tool cycle. A timing element in the form of a heart-shaped timing disc 56 is attached to the end of the shaft 54 within the housing 50 by means of a hub 57 and a nut 58. As the shaft 54 rotates, the timing disc 56 is rotated in a plane 59 perpendicular to the shaft 54. A plurality of fluidic sensors 60 (four shown in the drawings) are positioned adjacent the plane 59 in which the disc 56 rotates for sensing the disc 56 during predetermined intervals of each cycle. Each fluidic sensor 60 is of a conventional design, including an inner tube 61 mounted coaxially within an outer tube 62. Compressed air (not shown) is applied through a hose 63 to the sensor 60 where it flows through the annular region between the inner tube 61 and the outer tube 62 and is directed perpendicular to the plane 59. The effluent from the sensors 60 passes through a filter 65 and is expelled into the atmosphere. The inner tube 61 is connected to a hose 64 which passes through the hose 63. The hose 64 is connected to a pressure sensing device (not shown) or to a pressure responsive fluidic circuit (not shown). When the timing disc 56 moves in the plane 59 to a point where its surface intersects the flow of air emitted from the sensor 60, a pressure increase is applied through the tube 61 and hose 64 to the pressure sensing device or circuit. Thus, the pressure within the hose 64 varies cyclically as the disc 56 rotates to form a timing signal.

Figure 8:
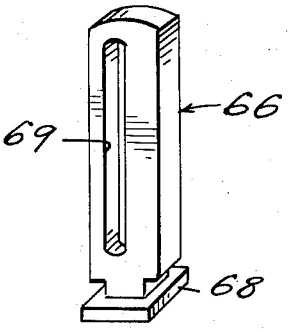
FIG. 8 is a perspective view of a sensor mounting bracket for use in the embodiment shown in FIG. 5.

The sensors 60 are mounted such that their position with respect to the timing disc 56 may be varied for establishing a desired dwell and point of occurrence for each generated timing signal. The sensors 60 are individually mounted on brackets 66 which are shown in detail in FIGS. 5–8. T-shaped sltos 67 are formed in and spaced around the inner periphery of the cylindrical housing 51 to extend in a direction perpendicular to the plane 59. Each bracket 66 has a flanged end 68 adapted to fit into a slot 67. The bracket 66 also includes an elongated slot 69 adapted to receive and mount one or more of the sensors 60. A nut 70 is threaded onto each sensor 60 for locking the sensors 60 at predetermined positions within the slot 69. It will be noted from FIGS. 7 and 8 that the elongated slot 69 is located slightly off-center on the bracket 66. Thus, the bracket 66 can be inverted for moving the slot 69 a short distance to one side or the other of the center of the T-slot 67 mounting the bracket 66. By selectively positioning the bracket 66 within a T-slot 67 and orienting the bracket 66 such that the slot 69 extends at a predetermined location, the timing signal generated by a sensor 60 positioned within the slot 69 is incrementally adjusted to provide a desired center point in the generated timing signal. The sensor 60 is positioned at a preselected location within the slot to control the dwell of the generated timing signal. By selectively positioning each sensor 60 in the elongated slot 69, infinite adjustment may be made of the dwell of the generated timing signal. The adjustment over the point of occurrence of each timing signal is incremental since the bracket 66 must be located at discrete positions around the housing 51, as determined by the location of the T-slots 67. However, if a sufficient number of slots 67 are provided in the housing 51, the timing of each generated signal may be accurately and closely selected. To obtain a timing signal having a predetermined dwell and a predetermined starting point in each cycle, the dwell is adjusted first. A bracket 66 is arbitrarily positioned in one of the T-slots 67 and a sensor 60 is then located in the bracket slot 69 while the disc 56 is rotated to obtain the predetermined dwell. The bracket 66 is then moved to the T-slot 67 which provides the predetermined starting point in the timing signal. The dwell remains constant when the bracket 66 is moved to a different T-slot 67 because the sensor 60 will remain the same distance from the center of rotation of the disc 56.

The device 50 may be provided with other well-known types of sensors, such as optical sensors, in place of the fluidic sensor 60. When optical sensors are used, a collimated light source is located on one side of the timing disc 56 and the sensors are located on the other side of the timing disc 56. The collimated light source may take the form of a single light source for each sensor. However, such an arrangement requires alignment of the light source with the sensor. Therefore, adjustment mounts must be provided for both the light source and the sensor and dwell and timing adjustments may be complicated. Any problem of this type may be eliminated by locating a single light source to direct a collimated light beam uniformly over, and perpendicular to, the path described by the rotating timing disc 56. The light is provided by a single incandescent lamp and a collimating lens. The lens may be mounted in place of the cover plate 53 with the lamp located exterior to the housing 51. The optical sensors are then located on the other side of the path described by the rotating timing disc 56. The thickness of the collimating lens may be minimized by using a Fresnel type lens. It will be readily apparent that other types of sensors also may be adapted to the device 50.

Figure 9:
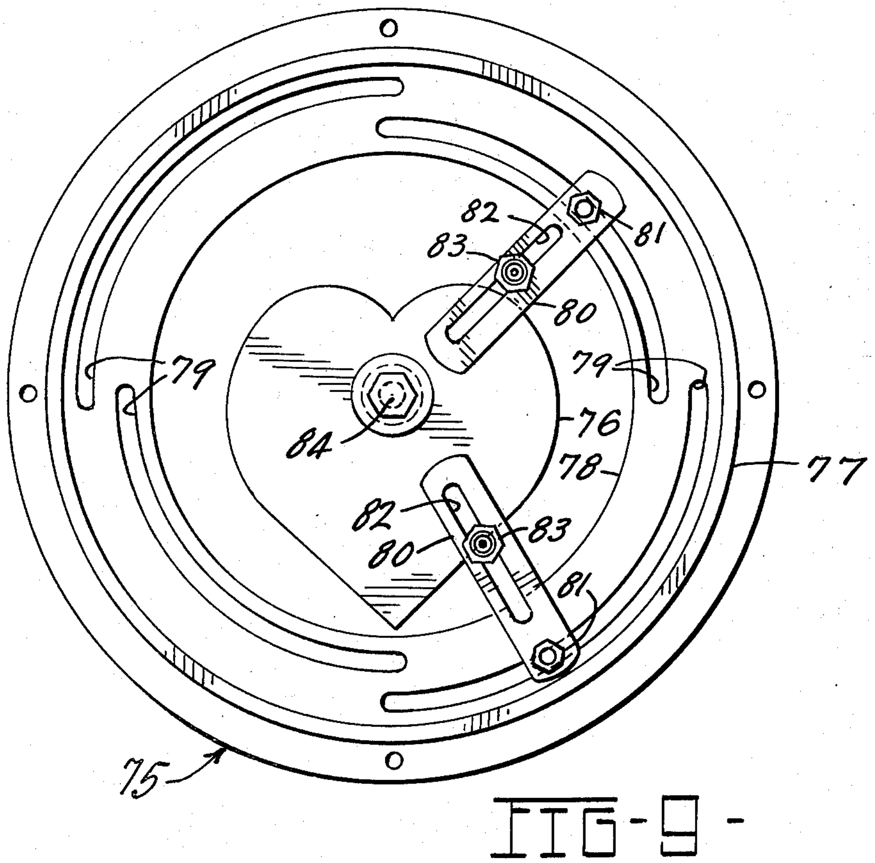
FIG. 9 is a front view of a modified embodiment of a cyclic timing device with the cover removed.

FIG. 9 shows a further modified embodiment of a device 75 for generating one or more timing signals during a cycle. A timing element, again in the general form of a heart-shaped disc 76, is rotated in synchronism with an operating cycle for which timing signals are generated. The device 75 includes a cylindrical housing 77. An inwardly directed flange 78 within the housing 77 has a plurality of semicircular slots 79 formed therein. The slots 79 are located to extend completely around the interior of the housing 77. Brackets 80 are attached to the housing 77 by means of bolts 81 which extend into the slots 79. Since the slots 79 extend completely around the interior of the housing 77, the brackets 80 may be positioned at any desired location within the housing 77. Thus, the timing or point of occurrence of a generated timing signal is infinitely variable. Each bracket 80 includes an elongated slot 82 for mounting a sensor 83. The position of the sensor 83 may be varied within the slot 82 in a direction radial to a center of rotation 84 of the heart shaped timing disc 76. The slots 82 are of a sufficient length to permit adjustment between a minimum radius and a maximum radius of the timing disc 76, as measured from the center of rotation 84. Thus, the dwell or duration of each generated timing signal is infinitely adjustable by moving the sensor 83 in the elongated slot 82.

Figure 10:
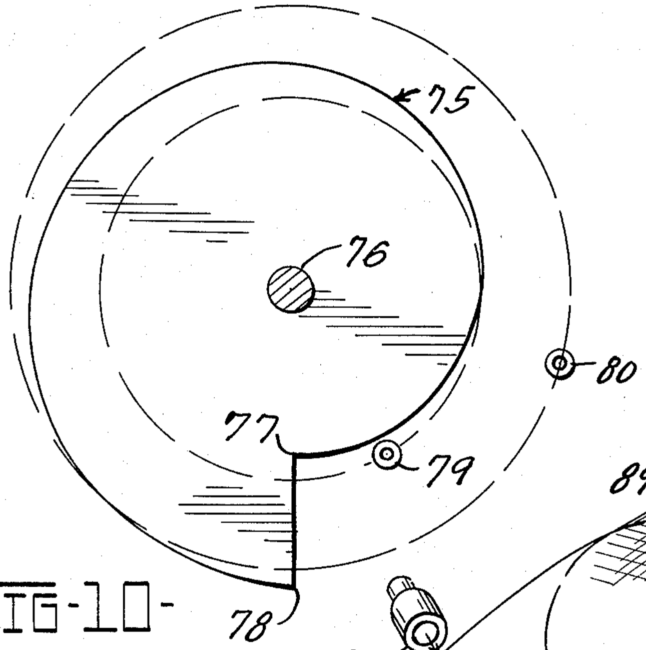
FIG. 10 is a plan view of a timing element having a spiral shape according to still another embodiment of the invention.

Referring now to FIG. 10, a plan view is shown of a timing element in the form of a spiral disc 75. The disc 75 is in the form of a 360° segment of an Archimedian spiral. If the disc 75 is mounted on a driven shaft 76 such that it is rotated in a counterclockwise direction, the outer edge of the disc 75 radially increases from a point of minimum radius 77 to a point of maximum radius 78 and gradually decreases back to the point of minimum radius 77 as the disc 75 is rotated through 360°. Two fluidic sensors 79 and 80 are shown located adjacent the path described by the rotating disc 75. The sensors 79 and 80 are radially spaced from the shaft 76 by a distance greater than the distance to the point of minimum radius 77 and less than the distance to the point of maximum radius 78. The sensor 79 generates a timing signal which is advanced over and of a longer duration or dwell than the timing signal generated by the sensor 80. The timing disc 75 has one advantage over the timing disc shown, for example, in FIGS. 2 and 3. As is clearly demonstrated in the graph of FIG. 4, when the sensor in FIG. 3 is moved radially from the position of the sensor 40 to the position of the sensor 41, both the dwell and the leading and trailing edges of the generated timing signals change. With the spiral timing disc 75 of FIG. 10, the sensor 79, for example, is located at the desired starting point of the generated timing signal. If the sensor 79 is then moved radially inwardly or outwardly, the dwell of the timing signal changes witout affecting the timing of the starting point or leading edge of the timing signal. If the direction of rotation of the disc 75 is reversed, radial adjustments of the sensors change the dwell of the generated timing signals without affecting the timing of the end or trailing edge of the generated timing signals.

Figure 11:
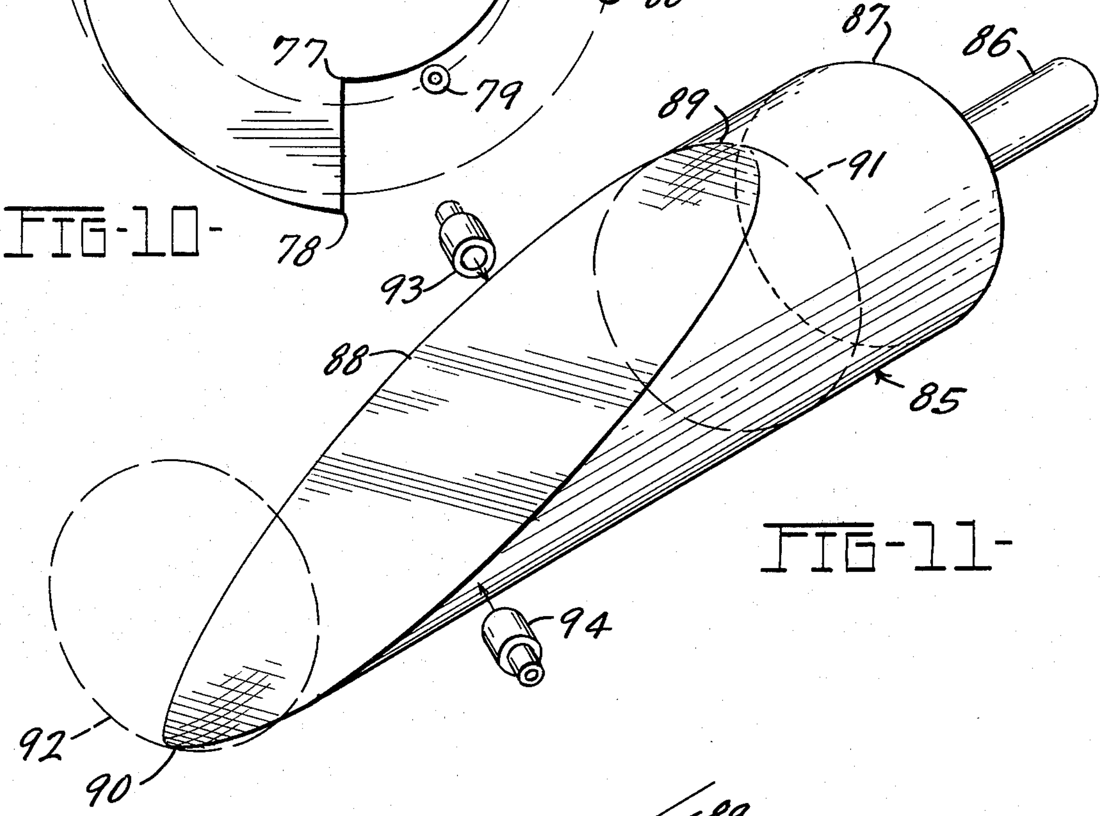
FIG. 11 is a perspective view showing a three dimensional timing element having the general shape of an obliquely truncated right cylinder.
Figure 12:
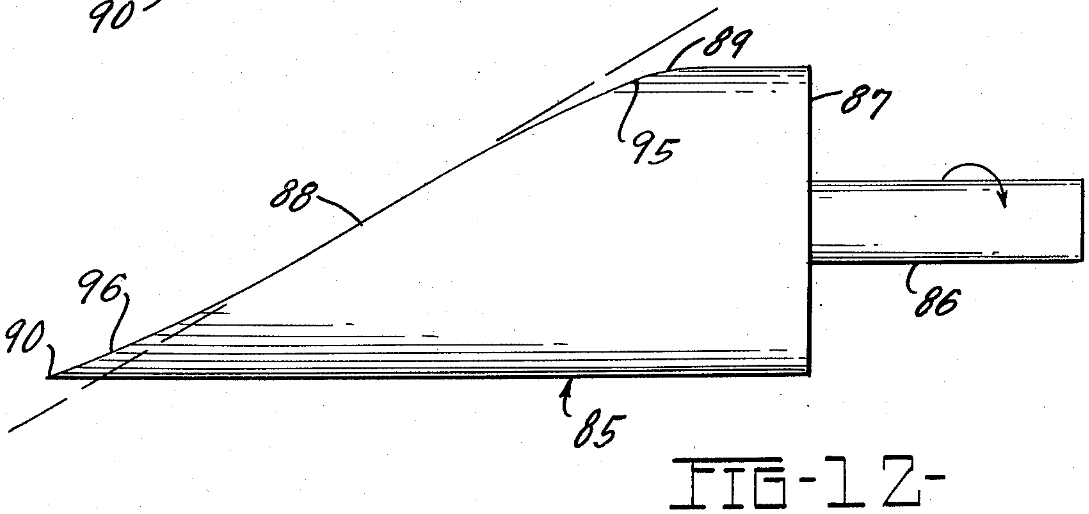
FIG. 12 is a side elevational view of the three dimensional timing element of FIG. 11.

Turning to FIGS. 11 and 12, a further modified embodiment of the invention is shown wherein a three dimensional cylindraceous timing element 85 is shown in the general form of an obliquely truncated right cylinder. The element 85 is attached to a shaft 86 which is rotated in synchronism with a machine or other device for which cyclic timing signals are generated by conventional drive means (not shown). The element 85 has an end 87 to which the shaft 86 is attached and an obliquely truncated end 88. As measured in a direction parallel to the axis of the element 85, the distance from the end 87 to a point 89 on the end 88 is of a minimum length and the distance from the end 89 to a point 90 on the end 88 is of a maximum length. As the element 85 is rotated, the points 89 and 90 describe paths 91 and 92, respectively.

One or more sensors, of which two fluidic sensors 93 and 94 are shown, are positioned to sense the presence and absence of the surface of the rotating element 85 at predetermined points in the region between the paths 91 and 92. The timing of the signals generated by the sensors 93 and 94 is changed by rotating the sensors about the axis of the element 85 while the dwell is changed by moving the sensors 93 and 94 in an axial direction between the paths 91 and 92. As a sensor is moved in an axial direction towards the path 91 described by the rotating point 89, the interval in each cycle during which the surface of the element 85 is sensed increases. Similarly, as a sensor is moved in an axial direction towards the path 92 described by the rotating point 90, the interval in each cycle during which the surface of the element 85 is sensed decreases.

Although the cylindraceous element 85 may be truncated by a flat or planar surface as shown by the dashed lines in FIG. 12, it is preferable to provide slight curvatures 95 and 96 to the truncated end 88 adjacent the points 89 and 90, respectively. The curvatures are in a direction which approach a tangent to the sides of the cylindrical element 85. The curvatures 95 and 96 on the truncated end 88 increase the sensitivity of the sensors as they are moved near the paths 91 and 92 just as the modification of the circular disc 11 of FIG. 2 to the heart-shaped disc 35 of FIG. 3 increases the sensitivity near the points of minimum and maximum radius 37 and 38. Although the element 85 is shown as having a specific shape, it will be appreciated that other three dimensional cylindraceous-shaped elements having a minimum and maximum dimension may be adapted for generating timing signals. It will also be appreciated that the manner in which the sensors are mounted adjacent the path described by the rotating timing element is not critical to the invention so long as the mounting provides the degree of adjustment necessary to obtain a desired timing signal.

In the exemplary embodiment of the invention shown in FIG. 1, an optical sensor including a light source 20 and a photocell 21 was used for generating a timing signal while in the exemplary embodiment shown in FIGS. 5–12 fluidic sensors were used for generating the timing signals. It will be appreciated that other known types of sensor elements may be used for generating the timing signal. The sensor element may, for example, comprise an optical light guide which reflects light from a timing surface on a rotating timing element either to a photodetector or to another light guide, a magnetic sensor, a proximity switch, or a mechanical switch which contacts the timing element. Where a plurality of sensors are provided for generating a plurality of different timing signals, the sensors may be either of the same type or of different types, depending upon the requirements for the timing signals.

It will also be appreciated that various modifications may be made in the exemplary timing elements shown, for example, in FIGS. 1, 7, 10 and 11. For example, the timing element in FIG. 1 may be in the form of a transparent circular disc centered on the shaft 12. An opaque coating or film having a circular or heart shape is then adhered to a surface of the transparent plate to form a timing surface. Since the transparent disc is centered on the shaft 12 and the coating or film forming the timing surface is very thin, the element will be dynamically balanced for high speed rotation. The thin opaque film on the disc is sufficient to operate the optical sensors for generating a timing signal. Or, the timing disc may be of a ferrous material or it may be of a disc having a ferrous coating defining the timing surface for actuation of either a magnetic sensor or a proximity switch. It will also be appreciated that although the timing surfaces are shown as being symmetrical, symmetry is not inherently required for obtaining an adjustable dwell timing signal. The primary requirement is that in the case of a generally flat timing element, the radius of the timing surface extends radially from a minimum value to a maximum value and back to the minimum value in moving either direction around the center of rotation of the timing surface. In the case of a three dimensional timing element, such as the obliquely truncated right cylinder, a linear measurement parallel to the axis of the cylinder extends from a minimum value to a maximum value and back to the minimum value as the timing element is rotated. For example, the principles described above for the spiral disc 75 of FIG. 10 may be applied to a three dimensional timing element by producing a cylindraceous element having an end in the general form of a 360° solid segment of a helix. The length of the element increases from a minimum value to a maximum value for increasing angles from 0° to 360° about the axis of the element and then suddenly decreases back to the minimum value in an axial direction. As long as the timing surface meets the increasing and decreasing measurement requirements, the timing signal may be adjusted from a signal which is fully off to a signal which is fully on with infinite dwell adjustment in between.

It will be appreciated that various other modifications and changes may be made in the above-described exemplary embodiments without departing from the spirit and the scope of the invention.

What I claim is:

1. An adjustable dwell cyclic timing device comprising, in combination, a timing element having a center of rotation and a timing surface with a continously changing radius from the center of rotation which for increasing angles in a predetermined direction around the center of rotation increases spirally from a minimum radius to a maximum radius and then decreases from the maximum radius back to the minimum radius, means for rotating said timing element about the center of rotation in synchronism with a timing cycle, at least one sensing means for generating a pulsed timing signal in response to sensing the presence and absence of said timing surface, means for mounting said sensing means for sensing the presence and absence of said timing surface at a predetermined point spaced from said sensing means and in the path of rotation of said element, such predetermined point lying in the region between the minimum and maximum radii of the rotating timing surface, and means for changing the location of said predetermined point within such region to adjust the point of occurrence of the timing signal to substantially any predetermined point in the timing cycle and to adjust the pulse duration of the generated timing signal to a predetermined duration ranging from substantially 0° to substantially 360° rotation of said timing surface.

2. An adjustable dwell cyclic timing device, as set forth in claim 1, wherein said timing surface decreases spirally from the maximum radius to the minimum radius for increasing angles around the center of rotation whereby said timing surface has a heart shape.

3. An adjustable dwell cyclic timing device, as set forth in claim 2, wherein said sensing means is a fluidic sensor.

4. An adjustable dwell cyclic timing device comprising, in combination, a timing element having a center of rotation, said timing element having a heart shaped timing surface with a radius from the center of rotation which spirally increases for an angle about the center of rotation increasing in a predetermined direction from 0° at a point of minimum radius to a maximum radius at 180° and spirally decreases back to such minimum radius through an increasing angle from 180° to 360°, means for rotating said timing element about the center of rotation in synchronism with a timing cycle, at least one sensing means for generating a pulsed timing signal in response to sensing the presence and absence of said timing surface, and means for adjustably mounting said sensing means for sensing the presence of said timing surface at a predetermined point spaced from said sensing means while said timing element is rotated through a preselected angular segment, such predetermined point lying in the path swept by said rotated timing element and between said minimum and maximum radii from the center of rotation, whereby said sensing means generates a cyclic timing signal during a preselected time segment in the timing cycle.

5. An adjustable dwell cyclic timing device, as set forth in claim 4, including a plurality of said sensing means, and wherein said adjustable mounting means includes means for adjustably mounting each of said sensing means for sensing the presence of said timing surface at a like plurality of different predetermined points spaced from said sensing means while said timing element is rotated through different predetermined angular segments, each such predetermined point lying in the path swept by said rotating timing element and between said minimum and maximum radii from the center of rotation, whereby said sensing means generates different cyclic timing signals during different preselected time segments of the timing cycle.

6. An adjustable dwell cyclic timing device, as set forth in claim 5, wherein each of said plurality of sensing means is a fluidic sensor.

7. An adjustable dwell cyclic timing device, as set forth in claim 4, wherein said sensing means is a line of sight sensor and wherein said adjustable mounting means mounts said sensor to sense obstructions in a line normal to the path through which the timing element is rotated.

8. An adjustable dwell cyclic timing device, as set forth in claim 4, wherein said sensing means is a fluidic sensor.

* * * * *